United States Patent [19]

Vaughan

[11] Patent Number: 5,326,734
[45] Date of Patent: Jul. 5, 1994

[54] PILLARED INTERLAYERED KANDITE CLAY COMPOSITIONS

[75] Inventor: David E. W. Vaughan, Flemington, N.J.

[73] Assignee: Exxon Research & Engineering Co., Florham Park, N.J.

[21] Appl. No.: 985,399

[22] Filed: Dec. 4, 1992

Related U.S. Application Data

[63] Continuation of Ser. No. 857,032, Mar. 24, 1992, abandoned, which is a continuation of Ser. No. 628,514, Dec. 17, 1990, abandoned.

[51] Int. Cl.$^5$ .............................................. B01J 21/16
[52] U.S. Cl. ........................................ 502/84; 502/80; 208/46; 208/111; 208/112; 208/113; 208/120
[58] Field of Search ................... 502/72, 63, 84, 80; 208/46, 111, 112, 113, 120

[56] References Cited

U.S. PATENT DOCUMENTS

| | | | |
|---|---|---|---|
| 4,176,090 | 11/1979 | Vaughan et al. | 502/84 |
| 4,193,454 | 3/1980 | Goldstein | 166/302 |
| 4,637,991 | 1/1987 | Battise et al. | 502/68 |
| 4,937,210 | 6/1990 | Jones et al. | 501/80 |
| 5,055,437 | 10/1991 | Herbst et al. | 502/67 |

FOREIGN PATENT DOCUMENTS

| | | |
|---|---|---|
| 0197012 | 10/1986 | European Pat. Off. |
| 0256185 | 2/1988 | European Pat. Off. |
| 0346007 | 12/1989 | European Pat. Off. |

Primary Examiner—Anthony McFarlane
Attorney, Agent, or Firm—Ronald D. Hantman

[57] ABSTRACT

This invention includes compositions of matter made up of a kandite clay which has been treated with large molecules containing multi-atom metallic or semi-metallic species and heated to produce pillars within the clay which are located generally between the clay's layers. The pillared kandite composition is useful as a catalyst support, sorbent, or ion exchanger.

The invention also includes a process for producing the pillared kandite composition comprises mixing the finely divided clay in an aqueous solution with the pillaring medium and heating the resulting composition at a temperature high enough to decompose the added compound.

30 Claims, 5 Drawing Sheets

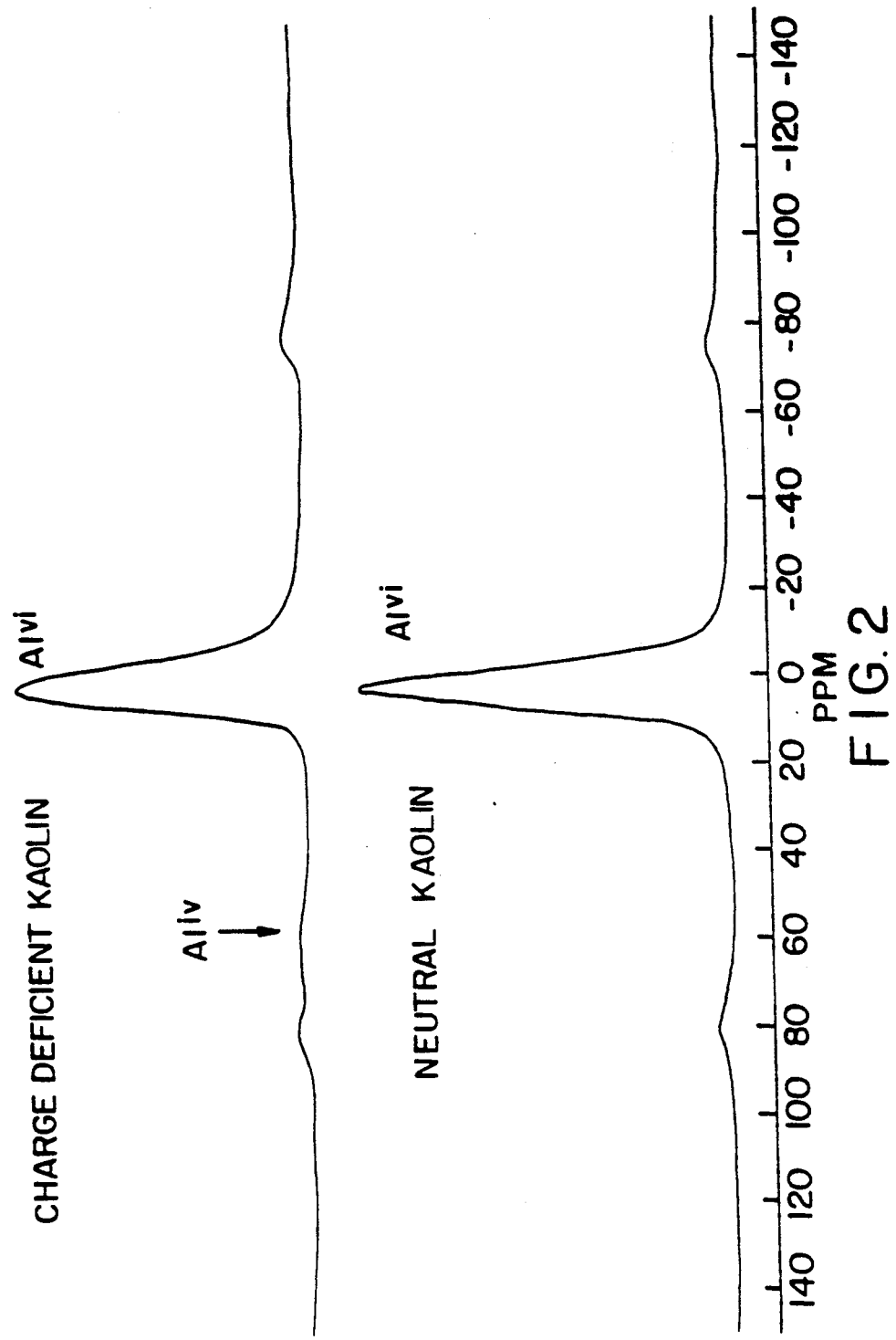

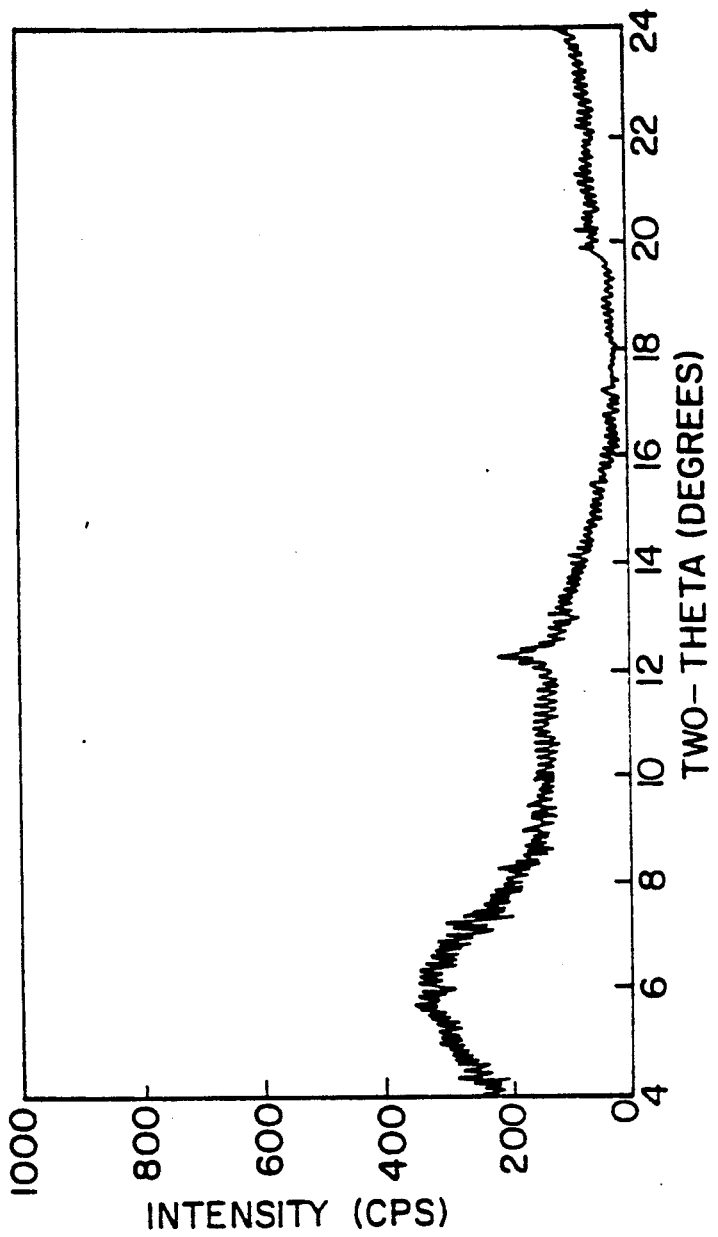

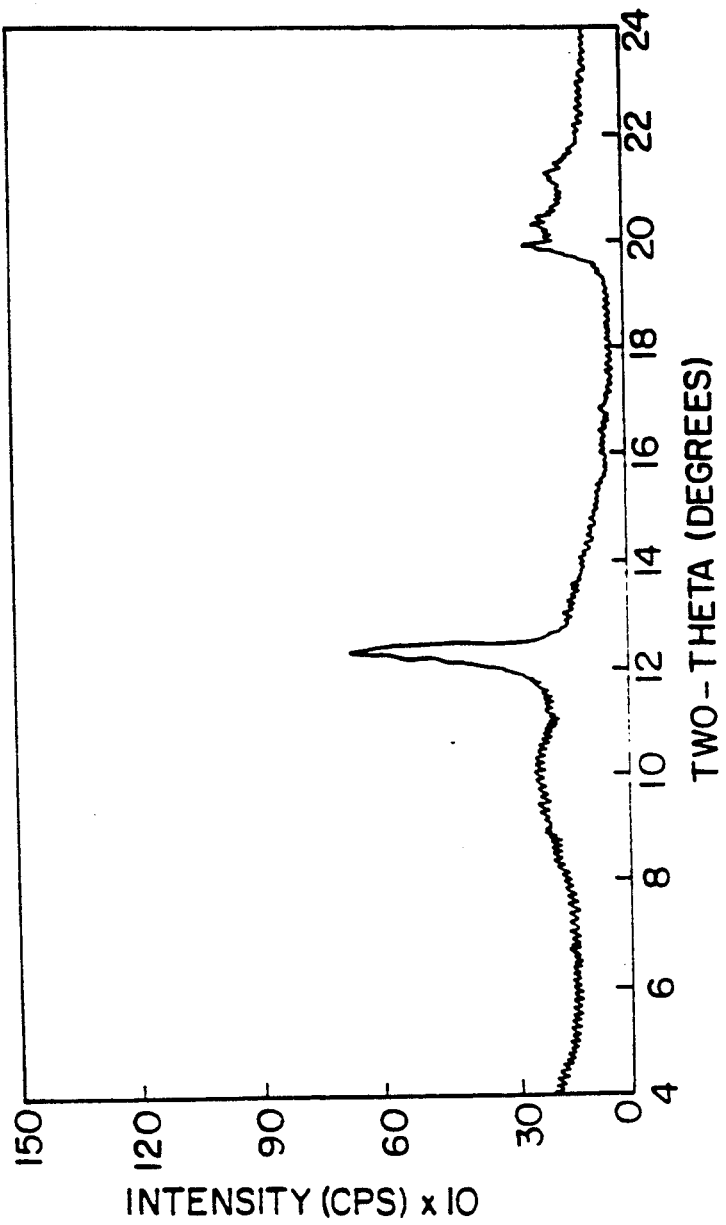

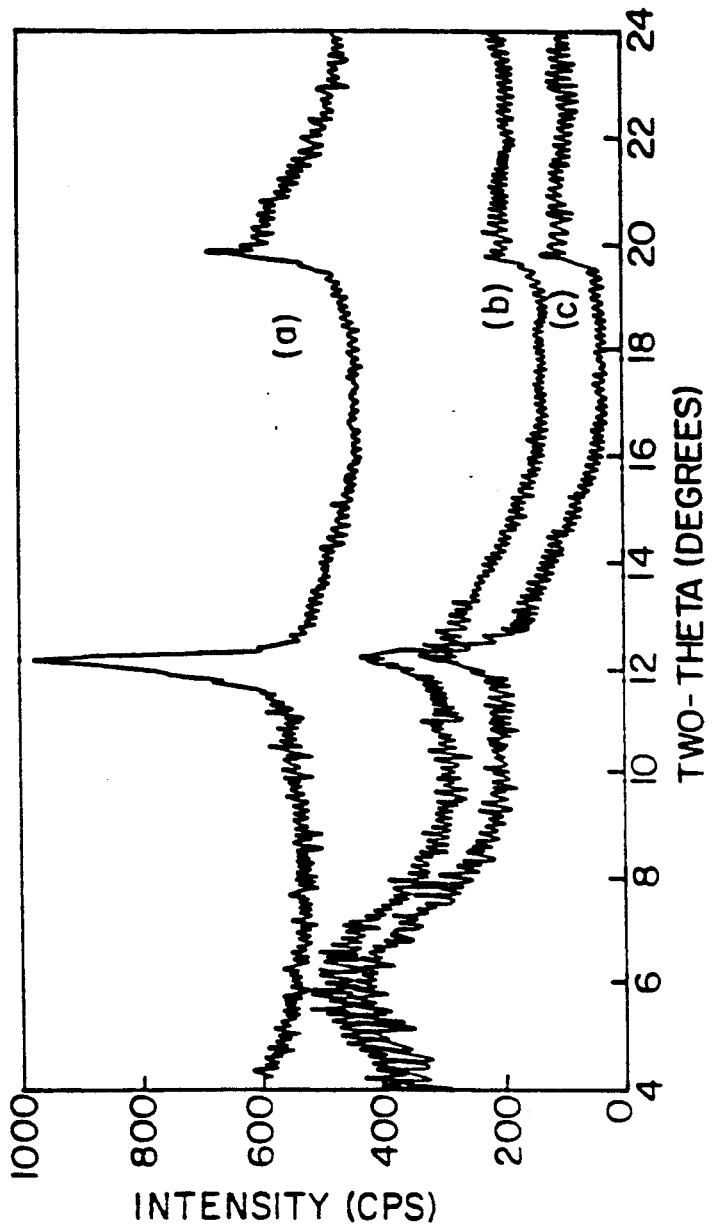

PILLARED INTERLAYERED KANDITE CLAY COMPOSITIONS

This is a continuation of application Ser. No. 857,032, filed Mar. 24, 1992 now abandoned, which is a continuation of Ser. No. 07/628,514, filed Dec. 17, 1990, now abandoned.

FIELD OF THE INVENTION

This invention is a composition of matter made up of a kandite clay which has been treated with large molecules comprising bulky multi-atom metallic or semimetallic species and heated to produce pillars within the clay and located generally between the clay's layers. The pillared kandite is useful as a catalyst, catalyst support, sorbent, ion exchanger, or in any other service requiring a high surface area, low cost, stable, support material. The processes for producing the pillared kandite clays are also a part of the invention.

BACKGROUND OF THE INVENTION

The term "clay" as used in various areas of technology, is subject to wide variations in meaning. However, an inclusive definition normally would be a naturally occurring sedimentary material generally composed of hydrated silicates of aluminum, iron or magnesium and often containing hydrated alumina and iron impurities. The particles of a clay are typically of at least near-colloidal size in at least one dimension (platelets are typical) and commonly develop thixotropic flow properties when sufficiently pulverized and wetted.

The organization of clay types remained somewhat poor until the development of satisfactory x-ray techniques for studying the atomic structure of individual clays. A paper: *Kaolin Materials*, U.S. Geological Survey Professional Paper 165-E, C. S. Ross and P. F. Kerr, 1930, pp. 151 to 176, is widely recognized as the beginning of a systematic approach to clay mineralogy. The monograph "Crystal Structures of Clay Minerals and their x-ray Identification" edited by G W. Brindley and G. Brown for the Mineralogical Society, is the most convenient standard reference. More recent work has been reviewed in a Mineralogical Society of American Monograph (Reviews in Mineralogy, Vol. 16, "Hydrous Phyllosilicates, Ed. S. W. Bailey, (1988)).

Included in the classes of clay minerals are smectite clays and kandite clays, the latter synonymously called diazeolites, serpentines, septochlorites and a variety of other specific names, depending on composition and layer orientation.

Smectites generally layered clays represented by the general formula:

$$(Si_8)^{iv} (Al_4)^{vi} O_{20} (OH_4)$$

where the IV designation indicates an ion coordinated to four other ions, and VI designates an ion coordinated to six other ions. The IV coordinated ion is commonly $Si^{4+}$, $Al^{3+}$, or $Fe^{3+}$ but could also include several other four coordinated ions, e.g., $P^{5+}$, $B^{3+}$, $Ge^{4+}$, $Be^{2+}$, etc. The VI coordinated ion is typically $Al^{3+}$ or $Mg^{2+}$, but could also include many other possible hexacoordinate ions, e.g., $Fe^{3+}$, $Fe^{2+}$, $Ni^{2+}$, $Cl^{2+}$, $Li^+$, etc. The charge deficiencies created by substitutions into these cation positions are balanced by one or more cations located between the structured platelets. Water may be occluded between the layers and either bonded to the structure itself or to the cations as a hydration shell. Commercially available clays typical of this class include natural and synthetic variants of montmorillonite, bentonite, hectorite and various mica or mixed mica-montmorillonite mixed phases, including synthetic varieties, the most common being materials such as SMM (synthetic mica-montmorillonite) originated by the Baroid Corp. The pillaring of said materials is well established and characterized (e.g., U.S. Pat. Nos. 4,176,090; 4,248,739; and 4,271,043) and the state of the art has recently been reviewed by Vaughan (Amer. Chem. Soc. Symp. Ser. #368, p. 308–323, (1988)), particularly as the basic concept has been applied to layer compounds other than clays.

Kandite clays, also often called "kaolinite" minerals, are made up of 1:1 layers of tetrahedrally oxygen coordinated silicon, bonded to layers of octahedrally bound cations. In kaolinite, dickite and nacrite all of the tetrahedral cations are $Si^{4+}$ and all of the octahedral cations are $Al^{3+}$ ( so called dioctahedral forms ). However, in the serpentinite varieties, major substitution of $Al^{3+}$ and $Fe^{3+}$ occurs for $Si^{4+}$ in the tetrahedral layer and a range of di- and trivalent cations substitutes for $Al^{3+}$ in the octahedral layer. The ion $Mg^{2+}$ is typically substituted for $Al^{3+}$, although any of the Fourth Period Transition elements, e.g., V, Cr, Mn, Fe, Co, Ni, Cu, Zn, may serve as substitutes. In some locations they may form major deposits, as in the case of garnierite, a major nickel ore. (Table 1 lists examples of various mineral kandites illustrating the multiplicity of chemical compositions. ) A main characteristic of the class is that each member generally has a 1:1 neutral layer. The ideal stoichiometry of the dioctahedral (kaolinite) and trioctahedral (chrysotile) end-members may be given respectively as:

$$Al_2Si_2O_5(OH)_4$$

and $$Mg_3Si_2O_5(OH)_4$$

TABLE 1

| EXAMPLES OF KANDITE MINERALS KAOLINS-SERPENTINES | | | |
|---|---|---|---|
| | VI | IV | |
| Kaolin | $Al_2$ | $Si_2$ | $O_5(OH)_4$ |
| Halloysite | $Al_2$ | $Si_2$ | $O_5(OH)_4$ |
| Chrysotile | $Mg_3$ | $Si_2$ | $O_5(OH)_4$ |
| Garnierite | $Ni_3$ | $Si_2$ | $O_5(OH)_4$ |
| Amesite | $(Mg, Fe)_2Al$ | Si Al | $O_5(OH)_4$ |
| Cronstedtite | $(R_{3-x}{}^{2+}, Fe_x{}^{2+})$ | Si, $Fe^{3+}$ | $O_5(OH)_4$ |
| Greenalite | $(Fe, Mg, Mn)_3$ | $Si_2$ | $O_5(OH)_4$ |

Mixed layers are common, as they are in all clay mineral types. However, Kaolin is quite unique as a mineral in that it exists in very high purity deposits in many parts of the world. The deposits in the states of Georgia and North and South Carolinas are particularly famous; the single layer thickness of this repeating sheet is about 7.2 Å. When layers of water separate the 1:1 sheets, the repeat sheet dimension expands to about 10.1 Å, as is seen in the halloysite variety of kaolinite. Halloysite in comparison is a relatively rare mineral in large deposits and rapidly irreversibly loses water on exposure to air.

Sorption of various organic molecules, such as glycerol, have been reported for kaolinite and the 2:1 smectite clays. Organic molecules do not as a rule produce permanent pillaring between the clay layers, but form intercalates which may exhibit molecular sieve properties in some cases, as described by R. M. Barrer (Clays and Clay Minerals, v. 37, p. 385-95 (1989)) and Theng ("Formation and Properties of Clay Polymer Complexes, Elsevier Press" (1979)), but readily lose such properties on heating to moderate temperatures. Similarly, intercalation of organic salts, e.g., potassium acetate, has been reported and are reviewed by MacEwan and Wilson (ibid, p. 236) and Barrer (*Zeolites and Clay Minerals* p. 407, 1978). Permanent pillaring has not been reported in 1:1 kandite materials hitherto, and is the principal focus of this invention.

Various non-kandite clays have been expanded to produce pillared materials. For instance, smectite-type clays treated with large cationic inorganic complexes result in large pore materials useful as sorbents and catalysts. See Vaughan et al, U.S. Pat. No. 4,176,090, issued Nov. 27, 1979 (hereinafter Vaughan '090); Vaughan et al, U.S. Pat. No. 4,248,739, issued February 3, 1981 (hereinafter Vaughan '739); and Vaughan et al, U.S. Pat. No. 4,271,043, issued Jun. 2, 1981 (hereinafter Vaughan '043).

Vaughan '090 is directed to the production of stable interlayered clay compositions which are prepared by reacting smectite-type clays with polymeric cationic hydroxy metal complexes of metals such as aluminum, zirconium, or titanium and mixtures of those. The resulting pillared smectites have pillars of about 6 to 16 Å between the clay layers. The resulting internal interconnected micropore structure (within the layer) has a majority of pores which are less than 30 Å in diameter. Vaughan '090 makes no mention of using kandite-type clays as starting material.

Vaughan '739 discloses a method for producing pillared interlayered smectite clays which is an improvement upon the method for producing pillared materials disclosed in Vaughan '090. The improvement is said to lie in the use of an interlayering compound which is a polymeric cationic hydroxy inorganic metal complex having an increased molecular weight in excess of about 2,000 to about 20,000. The resulting clay products have interlayer spacing of about 6 to 16 Å and have 80% of their pores less than about 40 Å in diameter. Again, Vaughan, '734 makes no suggestion of using kandite-type clays as starting material.

Vaughan '043 teaches a variation on the processes and products of Vaughan '090 and Vaughan '739 which entails treating the calcined products disclosed in those latter patents with a basic solution of a compound such as ammonia. The products treated in this manner are disclosed to have an enhanced ion exchange capacity. Vaughan '043 makes no suggestion of using a kandite-type clay as starting materials. A complete review of these patents has been published elsewhere (Catalysis Today, V. 2, p. 187-98, (1988)).

The disclosure in U.S. Pat. No. 4,060,480, to Reed et al, issued Nov. 29, 1977, suggests treating generally smectite-type materials with a aluminum compound, drying the product and calcining it to produce a clay having an expanded interlayer separation. Reed et al suggest that a gibbsite-like layer may be formed by such a treatment. No mention is made, however, of treating a kandite material in such a fashion.

Various modified hydrotalcite like materials (sheet structures related to clays) have also been subject to "pillaring" in various ways (U.S. Pat. No. 4,454,244). These materials are single sheet octahedral structures having a positive layer charge, and are therefore subject to pillaring reactions with anionic species (e.g., U.S. Pat. No. 4,454,244).

Recently several new layer structures have been successfully pillared with a variety of anionic, cationic and neutral inorganic polymeric molecules. They include various clays such as rectorite (European Patent Appln. 197,012) and tetrasilicia mica (Japanese Patent 56-142982); sheet silicic acids (European Patent Appln. 222,597; Deng et al, Chemistry of Materials, v. 1, p. 640-50, (1989)) which comprise a very large group of material (see F. Liebau for a review of such materials in "Structural Chemistry of Silicates" (Springer-Verlag (1985)); and zirconium phosphates (European Patent Appln. 159,756).

Several recent reviews of pillaring in clays and related sheet structures (Pinnavia, Science, 220, p. 365, (1983); Vaughan, "Catalysis Today", vol. 2, page 187-198, 1988; Vaughan, in "Perspectives in Molecular Sieve Science" Ed W H Flank et al, ACS Symp. Ser. 368, p. 308-23 (1988)) do not report kandite pillaring. Based on the viewpoint that pillaring requires a charge deficiency on the layer, the kandites would not be expected to be suitable pillaring substrates, as they are not recognized as having layer charge, and therefore have no ion exchange capacity. Reactivity and exchange in these materials is generally related to 'OH' groups at the edges of the crystals. I have discovered that these can indeed be pillared to form porous materials. The proposed structure is shown in FIG. 1, which compares a kandite with a hydrated kandite and a pillared interlayered kandite (PILK).

SUMMARY OF THE INVENTION

The present invention includes pillared interlayered kandite (PILKs) compositions which comprise kandite layers permanently spaced with inorganic metal or metal oxide "pillars" derived from charged or neutral metal oxo-, hydroxy or organometallic clusters comprising at least than four metal atoms. Such PILKs have basal spacings of at least 11 Å, representing an interlayer pillar size or void space of at least 4 Å. PILKs may be used as sorbents, catalysts, catalyst supports or matrices, extenders, fillers and ceramic precursors. The present invention also includes a method for making these compositions.

BRIEF DESCRIPTION OF THE DRAWINGS

FIG. 2 is a comparison of the $27_{Al\text{-}MASNMR}$ spectra for a charge deficient kandite and a neutral kandite.

FIG. 3 is the x-ray diffraction pattern for a kaolin pillared with zirconia.

FIG. 4 x-ray diffraction pattern of partly, expanded Nusheen (Freeport Kaolin Co.) kaolin.

FIG. 5 x-ray diffraction patterns of Hydrite UF (Georgia Kaolin Co.) expanded with ZAA (Magnesium Electron Co.) zirconia solution. A: sample treated at 22° C.; B: sample treated at 22° C. then 100° C.; C: sample treated at 100° C.

DESCRIPTION OF THE PREFERRED EMBODIMENTS

Figure 1A:
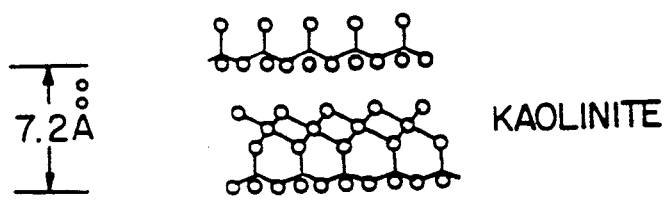
FIG. 1a is a schematic view of the structure of kaolinite.
Figure 1B:
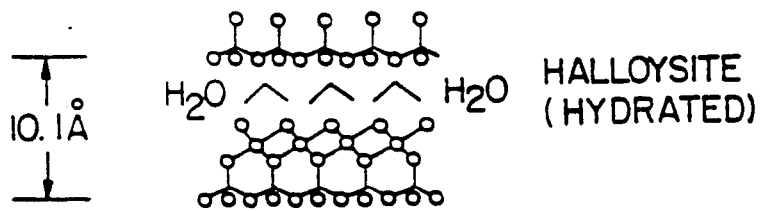
FIG. 1b is a schematic view of the structure of hydrated halloysite.
Figure 1C:
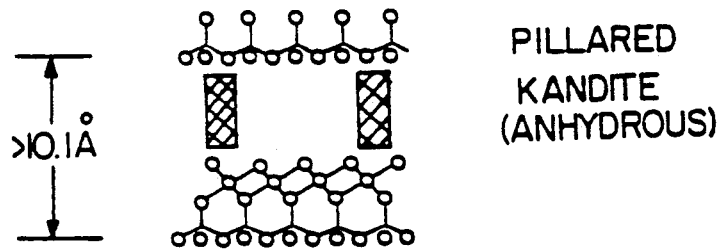
FIG. 1c is a schematic representation of a pillared kandite (PILK) product made according to this invention.

As mentioned above, the materials used as raw materials in the inventive process are kandite-type clays. Those clays are generally made up of 1:1 layers of tetrahedrally oxygen coordinated silicon bonded to layers of octahedrally bound cations. In kaolinite, dickite and nacrite, all of the tetrahedrally cations are $Si^{4+}$ and all of the octahedral cations are $Al^{3+}$. A schematic representation of the hydrated kaolinite ($Al_2Si_2O_5(OH)_4$) structure is shown in FIG. 1a. The interlayer distance for kaolinite and analogous kandites is about 7.2 Å. A similar schematic representation for hydrated halloysite is shown in FIG. 1b. The interlayer distance for halloysite is about 10.1 Å, but it readily irreversibly dehydrates to the 7.1 Å form. Retention of the 10.1 Å form necessitates storage and transfer of halloysite in a high humidity atmosphere. FIG. 1c illustrated the pillared interlayered kandite of this invention.

Clays have small substitutions of $Al^{3+}$, $Fe^{3+}$ and other possible tetrahedral substituents for $Si^{4+}$ in the tetrahedral layer; and a variety of di- and trivalent cations for the $Al^{3+}$ in the octahedral layer. The metal $Mg^{2+}$ is the usual substituent for $Al^{3+}$ although many of the Fourth Period Transition elements may act as that substituent in addition to $Mg^{2+}$ and $Li^+$ and there is a major literature base for such synthetic materials and their use as catalysts (e.g., U.S. Pat. Nos. 3,875,288; 3,976,744 and 4,033,858). The extensive literature on earlier synthetic clay work, including kandite synthesis, has been reviewed by Eitel (Silicate Science, vol 4, "Hydrothermal Silicate Systems", Academic Press (1966)). A main characteristic of the kandite class lies in the fact that each member has a 1:1 neutral or near neutral layer separated by water molecules in some hydrated forms. Typical commercially available clays include kaolinite, halloysite, and various fibrous, platy or prizmatic like chrysolites and serpentines, examples of which are listed in Table 1. However, numerous methods are known for the synthesis of various kandites, and such synthetic analogs are particularly advantageous for the objectives of this invention, in that they have high chemical purity and often very small crystal sizes. Methods have also been developed to convert the 7.2 Å kaolinite like minerals to the expanded 10 Å plus hallosite like variety, e.g., Costanzo et al, (Clays and Clay Minerals, 28, p. 155 (1980); ibid, 32, p. 29 (1984)). Such methods, when suitably manipulated, may also have the advantage, for the purpose of this invention, of low level controlled teaching of the octahedral cation ($Al^{3+}$ in kaolin) to generate a small charge deficiency on the kandite layer, and promoting the intercalation and pillaring reactions. Mild acid treatments with a variety of mineral and organic acids may have a similar effect.

This small charge deficiency on the layers seems to promote the pillaring to occur in the some kandites without any prior treatment. This is indicated by two comparable compositions, one of which shows some tetrahedral substitution of $Al^{3+}$ for $Si^{4+}$, and another that does not. FIG. 2a is the $^{27}Al$-MASNMR spectrum for a sample of halloysite from near Pyramid Lake, Nev., which shows a small tetrahedral $Al^{3+}$ component in addition to the expected large octahedral component. This material has been successfully pillared. FIG. 2b is a similar spectrum for a kaolin sample obtained from Freeport Kaolin Co. (Nusheen Kaolin), which we have successfully pillared only after an acid pretreatment, or with acidic polymer solutions. It shows only the expected $Al^{3+}$ octahedral component. It is therefore possible to divide the kandite pillaring reactions into at least two types or groups; one having initially neutral layers, and ones having a small layer charge. The charge deficiency may occur in the octahedral layers, or the tetrahedral layer by suitable lattice substitutions or reactions, as indicated above. Indeed the most economic mode of processing may be one that chemically selectively reacts one component of the layers to impart charge deficiency, so as to ensure optimum pillaring. This can be optimally achieved by a single intercalation treatment in an acidic solution.

A variety of metal complexes, particularly those containing atoms of the 3rd, 4th, 5th, and 6th periods of the Periodic Table (desirably Groups III-B, IV-B, V-B, VI-B, VII, and Mg, Al, Si, Zn, Ga and Ge), may be used in inorganic or organometallic cluster ions or molecules. The formation of stable pillars takes place by heating the clay infused with the pillaring medium in an oxidizing, reducing or neutral atmosphere at temperatures generally below about 300° C. to about 700° C. The resulting pillars may be, depending upon the pillaring medium and heating conditions chosen (temperature pressure and the gas present), either in the form of a metal oxide, metal sulfide, or reduced metal clusters, depending on whether the heating is carried out in a oxidizing (air, $O_2$), sulfiding ($H_2S$) or reducing ($H_2$, $CH_4$), atmosphere.

The invention includes a variation of the solution technique for infusing pillaring medium into clays having a water layer (halloysite) or no water layer (kaolinite). Preliminarily variations open the sheets to later inclusion of the large molecule pillaring medium by first opening the layers with small salt molecules, e.g., aqueous potassium acetate, $NH_4F$-DMSO solutions, etc., or non-pillaring but expanding solvents, e.g., DMSO, alcohols, glycerol, dimethyl sulfoxide, etc. The preliminary step is followed by introduction of the pillaring medium, followed by vacuum or controlled atmosphere heat treatments, which may include spray drying. This initial intercalation may be accompanied by layer reaction (e.g., $Al^{3+}$ leaching by $NH_4F$, EDTA, etc.).

It is recognized that the kandite materials, whether they be natural minerals or synthetic materials, are hydroxylated materials that dehydroxylate and lose some or all of their structural long range crystallographic order between 400° C. and 600° C., after the major loss of interstitial and surface water at about 80° C.–170° C. However, this loss of crystallographic order does not, in the case of pillared materials, mean that the high microporosity of the system is also lost.

In any system of fine crystal sheet particles and polymer clusters a mesoporosity will be developed characteristic of random flocculation of sheet with sheet, and sheet with polymer. This is an integral and essential property of the system well known in the art. It is the necessary development of a regular and ordered microporosity superimposed on this mesoporosity that is the essential invention. Such a microporosity, shown as pores less than about 30 Å in conventional pore size distribution analyses, will usually constitute at least 35% of the pore volume or equivalent nitrogen surface area of the pillared kandite, or PILK. The mesoporosity may be maximized by using synthetic colloidal crystal forms of kandite as the raw material for the purposes of this invention.

The present invention includes both composition of matter, pillared kandite-type clays, and processes for producing those compositions, and the refractory products which may result from the heating and calcination of such materials.

The method for pillaring kandite clays include solution or vapor phase intercalation of a pillaring medium made up of a salt pair, changed molecular cluster or neutral molecule between the 1:1 layers of the mineral. One component of the pillaring medium must be a larger multi-atom complex such that even after decomposition of the pillaring medium within the clay, the clay layers have a separation of 5 Å or more. Typical generic species include aluminum chlorhydrol $Al_{13}O_4(OH)_{24}Cl_7$ (large cation, small anion) silico-tungstic acid, $H_4SiW_{12}O_{40}$ (large anion, small cation), zirconyl oxychloride complexes in addition to any one or more of the many homopoly or heteropolymetallate complexes, some of which may include organic ligands.

The pillaring medium used in the practice of the present invention may be either a salt pair changed molecular cluster or a neutral molecule but generically must include a large multi-atom complex which produces, after the heating step disclosed below, some stable pillars between the clay layers. Generally any decomposable pillaring medium, particularly those containing atoms of the 3rd, 4th, 5th and 6th periods of the Periodic able and more desirably those from Groups IB, IIB, IV-B, V-B, VI-B, VII-B, VIII as well as Mg, Al, and Si in those periods, are acceptable. The group of metals generally known as refractory metals are especially suitable. Examples of the generic inorganic class include aluminum chlorhydrol $(Al_{13}O_4(OH)_{24}Cl_7)$ and substituted derivatives, organic derivatives of the metals and semimetals listed above (e.g., tetramethylammonium (TMA) silicate $((TMA)_8Si_8O_{20})$), and the many hetero polymetallate clusters represented by the formula:

$$A_a[L_lM_mJ_rO_y]dH_2O$$

wherein

A is an ion selected from the group consisting of hydrogen; one or more of the Group I-A to III-A or I-B to VI-B metals; one or more of the rare earth metals; ammonium, alkyl ammonium, alkyl phosphonium or alkyl arsonium; carboxylate or a mixture of two or more thereof;

M is Zn, Al, Ga, Ge, Ti, Cr, Mn, Fe, Co, Rh, Zr or a mixture of two or more thereof;

L is P, As, Si, Al, H or a mixture of two or more thereof;

J is Mo, W, V, Nb or a mixture of two or more thereof;

a is a number which when multiplied by the valence of A will result in balancing the charge on the complex within the brackets;

l is a number ranging from zero to about 20, preferably from zero to about 2;

m is a number ranging from zero to about 20, preferably from zero to about 6;

r is a number ranging from about 1 to about 50, preferably from about 6 to about 12;

y is a number ranging from about 7 to about 150, preferably from about 24 to about 40; and d is a number ranging from zero to about 150, preferably from about 6 to about 75;

A is preferably H, Na, K, $NH_4$, F, Cl, Br, I, $CH_3COO$ or a mixture thereof.

M is preferably Ni, Mn, Zn, Ti, Co or Cr.

L is preferably H or P.

J is preferably Mo or W.

The alkyl groups on the alkyl ammonium, alkyl phosphonium and alkyl arsonium can each have up to about 6 carbon atoms. The alkyl ammonium, alkyl phosphonium and alkyl arsonium compounds can be mono-, di-, tri- or tetra-alkyl compounds. When more than one alkyl group is present, they can be the same or different.

In various embodiments L is H; M is Al, Mn, Fe, Co, Ni, Zn, Zr, Ga or Rh; J is Mo; l is 6, z is 6, y is 24 and m is 1; or in another embodiment L is H, l is 6; J is W; z is 6; y is 24; M is Ni; and m is 1; or another embodiment l is zero; J is W; z is 6; y is 24; M is Mn or Ni; and m is 1. In other embodiments l is zero; J is W; z is 11; y is 39; M is B, Ga, Fe, Co or Zn; and m is 1; l is zero; J is W; z is 12; y is 40; M is B, Ga, Ge, Cr, Mn, Fe, Co or Zn; and m is 1. In still configurations l is zero; J is Mo; z is 12; y is 40; M is Ge, Zr or Ti; and m is 1; l is zero; J is Mo; z is 9; y is 32; M is Mn or Ni; and m is 1; l is zero; J is Mo; z is 10; y is 36; M is Co; and m is 2; A is Cl, M is Zr and M is a multiple of 4.

An especially suitable process for pillaring the kandite clays includes the steps of first finely dividing and dispersing the clays in water to produce a thin slurry. This slurry may be allowed to stand to settle out non-dispersed clay solids and impurity components such as quartz. The upper layer containing dispersed clay is then separated to yield a clay precursor suspension of small crystals. (Numerous processed high purity kaolins are commercially available throughout the world so that this purification step is not usually necessary for routine PILK synthesis.) The suspension is then intimately mixed with an appropriate amount of an aqueous, preferably acidic, solution of the pillaring medium. This mixing may take place in any reaction vessel or mixing equipment. The mixed suspension is then desirably heated to enhance the reaction and permeation rates of the pillaring medium into the clay particles. Temperatures below about 200° C. are generally acceptable. Obviously the reaction vessel must be capable of withstanding the autogeneous pressure resulting from the reaction step. In the reaction of kaolin itself, temperatures above about 50° C. and less than 100° C. are particularly effective.

If the clay is of the sort that is only mildly hydrated, such as kaolinite, an additional or preliminary step may be desirable. This step may entail the sorbtive addition of a small salt molecule such as aqueous potassium acetate or $NH_4FF$-DMSO solutions or a polar non-pillaring but expanding organic solvent, e.g., $C_1$ to $C_4$ alcohols, glycerol, acetic acid, etc., to the thin clay suspension prior to addition of the pillaring medium, or using such as solvents in place of water for the primary suspension medium. The small salt molecules and solvents will, after a period of time preferably at an elevated temperature and for a time similar to that used in the step of reacting the clay with the pillaring medium, open the clay layers to admit the larger pillaring medium. The pillaring medium may then be added directly to the clay suspension.

After pillaring, the reaction product is then calcined in an oxidizing, reducing or inert atmosphere. If the pillared interlayered (PILK) kandite is to be used as a catalyst support, an oxidizing atmosphere may be most desirable in that the metals or semimetals in the pillaring medium will end up as oxides in the pillars, e.g., tungsten oxide, silica, alumina, titania, zirconia, thoria, etc.

If, on the other hand, catalytic properties from metals are expected of the pillars, a reducing atmosphere containing hydrogen, carbon monoxide, or other known reducing gas is desirable. If the PILK product is to be used in hydrotreating reactions it may be desirable to calcine the precursor form in a sulfiding gas such as hydrogen sulfide.

The catalytic and absorbent characteristics of the pillared interlayered kandite clays of the present invention may be modified with a wide range of compounds including salts of ammonium and metals of Groups I-B through VIII of the Periodic Table. Impregnation of these salts is the preferred mode of inclusion. These products are particularly useful for reactions taking place below 500° C. to about 600° C. and requiring high specific surface area. When the structure of the clay layer itself is deemed to be important. However, even when the clay sheet is degraded, the PILK will have high useful micropore volume, derived from the pillar-metakaolin, or pillar mullitized metakaolin, quasi-sheet structure. Kaolin itself has a low surface area, typically less than 10 $m^2/gm$, and often less than 5 $m^2/gm$. The procedures of this invention frequently increase the surface areas of the subject kandites by at least a factor of five, and frequently a factor of ten. Surface areas ($N_2$) over 250 $m^2/gm$ have been measured on PILK materials of this invention.

FIG. 3 schematically depicts the structure of the pillared clay after heating and either before or after additional post exchange or impregnation. It should be understood that within most clay structures, the layers are not uniform. The clay may sometimes be heterogeneous chemical mixture in which the composition of one layer may differ somewhat from that of a neighboring layer. Because of the slight variation in composition between layers, one would expect slight differences in the amount of pillaring medium intercalated between the differing layers, and a number of layers within a clay stack may not expand at all. Since the size of the metal complex in the pillaring medium is the controlling factor in setting the interlayer distance, heterogeneity on the layers should affect only the number and reactivity of pillars formed from a particular pillaring medium but not the height of the pillar. If the pillaring solution includes more than one molecular entity, then the layer spacing in the product may show more than one value.

The heat treated pillared kandites of the invention have an interlayer spacing greater than the clay which is the starting material. For instance, the interlayer spacing of kaolinite will be greater than 7.2 Å. The pillared materials show enhanced reversible sorption capacity for water and hexane at low partial pressures, which are indicators of the relative surface areas and internal pore volumes of the materials.

These pillared kandites are useful as adsorbents and catalytic supports. They can be combined with other catalytic components such as silica, alumina, silica-alumina, natural or synthetic zeolites, various oxides and other clays. They are particularly useful as molecular sieve absorbents and as catalyst supports and matrices, as actual catalysts, or as substrates for metal cluster catalysts.

Kaolin itself is widely used as a low cost filter, extender and coating material in a wide variety of applications. Pillared materials (PILKS) may significantly improve and extend such applications.

Similarly kaolin is used as a raw material in the manufacture of ceramics and refractories. The methods of this invention provide a mechanism for ready control and manipulation of various compositions for the improvement of such products, and the invention of novel materials based upon PILK which may lead to new products and materials of these types.

Many different kinds of swelling clays are used as the necessary component of drilling for crude oils, but kaolin is non-swelling in its conventional use, and is therefore rarely if ever used. The modified PILKS of this invention provide a means of utilizing low cost kaolins in drilling mud applications.

Having described the basic and broad aspects of the invention, the following specific examples are given to illustrate preferred embodiments and are not offered to limit, in any way, the scope of the invention.

EXAMPLE 1

A 44 gm sample of fully hydrated halloysite from a deposit near Pyramid Lake, Nevada, (K. G. Papke, Clays and Clay Minerals, 19, p. 71, (1971)) was chopped and dispersed in 500 ml $H_2O$, using a commercial blender, for 30 minutes. The slurry was allowed to stand for ten minutes to settle the nondispersed fragments, then 300 mls were decanted, to yield a suspension containing about 5% solids. 90 ml of this suspension were mixed with 25 gm of a commercial Al "chlorhydrol" solution (Reheis Chemical Co.) containing 50 wt % of the polymer. After thorough homogenization the sample was placed in a Teflon jar and heated at 150° C. for 64 hours. After reaction, the product was fully gelled. After filtering and freeze drying, the product was equilibrated at 88% relative humidity over a saturated $BaCl_2$ solution. X-ray diffraction analysis showed a residual halloysite peak on a broad peak extending to less than about 15 Å. Thermogravimetric analysis to 600° C. showed a total weight loss of 32 wt % with 28% occurring below a temperature of 300° C. To determine the reversibility of the less than 300° water loss, a sample of the 125° C. oven dried material was calcined for two hours at 370° C., rehydrated at 88% relative humidity overnight and again dehydrated on a thermogravimetric analyzer, resulting in 10 wt % loss up to 300° C. The same calcined sample was equilibrated with n-hexane in a gravimetric sorption apparatus at 20° C., showing a sorption capacity of 8 wt % at a pressure of 60 torr. These data are summarized and compared with Examples 2 and 3 in Table 2.

The sample has clearly a "zeolitic" sorption capacity that is typical of a pillared material and quite different from the original clay.

EXAMPLE 2

200 gms of the halloysite decant liquid from Example 1 was mixed in a blender for ten minutes with 12.1 gm $ZrOCl_2$ 8 $H_2O$ that had been partly dehydrated at 270° C. for 15 minutes. 180 mls of this sample were reacted at 100° C. in a 500 ml. Teflon jar for 41 hours, after which time the sample had expanded to fill the jar. The sample was filtered and freeze dried (Sample a). 20 mls of this slurry were placed in a 25 ml Teflon jar and aged at 150° C. for 64 hours. After cooling, filtering and freeze drying overnight, the sample was equilibrated with water at 88% relative humidity (Sample b). Dehydrated to 600° C., this material showed a weight loss of 32 wt % (Sample c). X-ray diffraction patterns of a, b and c show broad spectral intensity between 10.5 Å and less than 20 Å. Dehydration of the (b) material at 300° C. followed by rehydration at 88% relative humidity showed a reversible water sorption capacity of 7 wt %; n-hexane sorption at 20° C. gave a sorption capacity of 5.5 wt % at a pressure of 60 torr, and after outgassing at 350° C. under vacuum, an ortho-xylene capacity of 8% at $P/P_o=0.8$ and 20° C. Chemical analysis gave an $Si/Zr=2.3$. These data are summarized and compared with similar results for Examples 1 and 3 in Table 2.

EXAMPLE 3

To 100 ml of the aqueous halloysite slurry made in Example 1 were added 5.4 gm phosphomolybdic acid ($H_2MoP_{12}O_{40}$) with brisk stirring. 20 gms of the slurry were placed in a small Teflon autoclave and reacted for 64 hours at 150° C., after which time the product was filtered, washed and dried at 125° C. X-ray diffraction showed a broad peak above about 10 Å. On analyzing the weight loss as a function of temperature, the sample lost a total of 14 wt % up to 300° C., and a further 8.5 wt % between 300° C. and 500° C., in a thermogravimetric analyses. After reequilibrating at 88% relative humidity overnight, thermogravimetric analysis gave a total weight loss of 12 wt %, 8.2 wt % occurring below 300° C. These data are summarized and compared with those for Examples 1 and 2 in Table 2.

TABLE 2

| Sorption Properties of Pillared Kandites (Examples 1-3) | | | | |
|---|---|---|---|---|
| Example/$P/P_o$ | $H_2O$ 0.8 | n-hexane 0.3 | o-xylene 0.8 | mesitylene 0.6 |
| Example 1 | 32% | 5% | 8% | — |
| Example 2 | 32% | 5.5% | 8% | 8.5% |
| Example 3 | 22.5% | 7% | 8% | 11% |

EXAMPLE 4

10 gm of Nusheen kaolin (Freeport Kaolin Co.) were reacted with 50 gm ZAA solution (20 wt % zirconium oxychloride dissolved in acetic acid, Magnesium Electron Inc.) diluted with 50 gm deionized water in a 125 ml Teflon jar for 53 hours at room temperature. The clay sample was filtered from the solution, washed, then dried at 100° C. in an air oven. The product was identical to the starting material (i.e., was not pillared). An identical reaction carried out at 100° C. in an air oven produced a product which filled the reaction vessel, and on drying showed only a minor kaolin x-ray diffraction peak at ~7 Å and a broad peak centered at about 14.5 Å (FIG. 3). After calcining this sample at 480° C. for 4 hours then equilibrating it in a hydrator at 56% RH., the sample sorbed 9.7% wt. $H_2O$. When similarly calcined at 700° C. (i.e., all carbon burned off) and rehydrated the material sorbed 11% $H_2O$. In contrast a sample of untreated kaolin calcined in this manner at 700° C. and rehydrated, showed negligible weight gain.

EXAMPLE 5

60 gm of an unrefined kaolin clay standard K Ga-2 (Source Clay Minerals Repository, University of Missouri; sample from Warren County, Ga.) were slurried with 360 gm dimethyl sulfoxide (DMSO) and 50 gm deionized water, then reacted at 60° C. for 21 hours. 13 gm $NH_4F$ dissolved in 30 gm deionized water were added, and the reaction allowed to proceed for a further 18 hours. Sampled at this time the x-ray diffraction analysis showed that ⅔ of the material had expanded to the "halloysite" form with a 10.2 Å basal spacing. The product was filtered, then washed to remove excess DMSO. This filter cake was then reslurried in 160 gm deionized water. 50 gm of the slurry was then reacted with a pillaring solution of 20 gm "chlorhydrol" (Reheis Chemical Co.) which had been preaged at 100° C. for 1 day. After reacting for 17 hours at room temperature the sample had fully gelled, showing some gradation of higher density material to the bottom. The top part of the sample was filtered, and the filter cake freeze dried. X-ray diffraction analysis showed the product to comprise about 35% unexpanded kaolin, and a broad peak centered at about 10 Å representing the expanded portion. The sample was rapidly heated to 400° C., then slowly heated to 530° C. in an air oven over a 6 hour period. After cooling and weighing, the sample was equilibrated over a saturated solution of magnesium nitrate (56% RH). After reweighing, the sample had sorbed 23.5 wt % $H_2O$. X-ray analysis showed only a broad weak peak in the region of 20-22°2θ (region of ool reflections). The material clearly has a novel porous structure totally unlike the original kaolin or calcined kaolin. The freeze dried sample it was calcined at 400° C. in a vacuum of $10^{-4}$ torr, then subjected to a standard nitrogen pore size/surface area analysis. The sample had a surface area of 83.7 m²/gm, with a majority of pores less than 30 Å. (In unrefined samples, such as KGa-2, segregation in solution is to be expected, resulting in the smaller particle kaolin reacting better than the larger particle clay. This can be eleviated by first sedimenting out the coarse fraction, a standard procedure in clay studies, and reacting only the portion which remains suspended in solution. In commercial samples this process is done as part of the initial purification and refining of the kaolin.)

EXAMPLE 6

A sample of Nusheen kaolin (Freeport Kaolin Co.) was used in place of KGa-2 in the general preparation of Example 5. The freeze dried product was lightly ground and x-rayed, to give a diffraction pattern shown in FIG. 4, indicating that part was expanded and part retained the kaolin layer spacing. The sample was calcined at 400° C. for 1 hour then equilibrated with $H_2O$ in a hydrator at 50% RH for 3 hours. The sample gained 8.2 wt %. The same sample was further maintained in the hydrator for 3 days, at which time the sample had sorbed 10.3 wt % $H_2O$.

EXAMPLE 7

10 gm UF kaolin (Georgia Kaolin Co.) were slurried in a solution of 50 gms $H_2O$ and 50 gms ZAA zirconia solution at room temperature for 15 hours with continuous stirring on a hot plate-magnetic stirrer. Half of the sample was filtered (Sample A) and the other half sealed in a Teflon bottle and heated at 100° C. for 5 hours (Sample B). A further 10 gms of UF kaolin were reacted with 100 gms of a 50/50 $H_2O$/ZAA solution at 100° C. for 15 hours (Sample C). Samples B and C were filtered on a vacuum filter then oven dried at 100° C. X-ray diffraction patterns of these samples (FIG. 5) show that Sample A was unchanged kaolin, and that Samples B and C were 80-90% expanded, showing broad peaks in the region of about 16 Å. Samples B and C were calcined at a temperature of 480° C. for 2 hours then equilibrated with water in a hydrator at 56% RH overnight, sorbing 7.3 wt % and 9.1 wt % $H_2O$ respectively. After calcining at 700° C. for 2 hours and similar hydration they sorbed 10.5 wt % and 4.4 wt % $H_2O$ respectively.

EXAMPLE 8

10 g garnierite, a nickel silicate mineral (Table 1), were soaked in 200 g water for 16 hours then blended for 15 minutes to produce a finely divided suspended clay. One half of this slurry was placed in a 125 ml Teflon jar, 20 g ZAA solution (containing 20% $ZrO_2$) were added and the jar sealed. After two hours reacton at 100° C. the sample had expanded to fill the aqueous volume in the jar. This product was freeze dried. The X-ray diffraction pattern (FIG. 6) shows the expanded clay together with some non-expanded clay. 1 g of this sample was calcined at 450° C. for two hours then exposed to water vapor at 54% relative humidity for 2 hours. The sample sorbed 10.8 wt %. This same sample was then calcined at 600° C. for one hour and again similarly rehydrated. The sample sorbed 10.8 wt %. A sample of kaolin similarly treated at 600° C. and rehydrated sorbed 0.1 wt %.

EXAMPLE 9

250 gm distilled water (DW) were mixed with 58.75 gm ZAA solution (a zirconium acetate in acetic acid solution made by Magnesium Elektron Inc.), to which 53.4 gm UF kaolin (Georgia Kaolin Co.) were added. The beaker and contents were heated on a hot plate to reflux conditions. At about 90° C. a gel formed and 100 gm DW were added. This gelled after a few minutes and was broken by the further addition of 100 gm DW. This solution was refluxed for 2½ hours. This solution was added to a blender, diluted with 300 gm DW and 57.5 gm 40% colloidal silica solution (HS-40, DuPont Co.), then 30 gm of precalcined (400° C./3 hours) LZY-82 faujasite (Union Carbide Corp.) were added and the whole blended at high speed for 30 minutes. This was then spray dried in a laboratory Buchi spray dryer. The product was pilled in a Carver Press at about 4000 psi, and the pills crushed and sieved to yield +38-150 micron fraction. This was calcined at 600° C. for 2 hours. After steaming for 5 hours at 1400° F. (1 atm steam), the catalyst was tested as a cracking catalyst using a standard test method (ASTM D3907), using a 21.4 API gravity residual oil feedstock containing 2.65% sulfur. The catalyst activity profile, detailed for duplicate experiments in Table 3, shows that this is a high activity catalyst with desirable light cycle oil selectivity and very good conversions of the heavy ends.

TABLE 3

| C/O | 3.08 | 3.31 |
|---|---|---|
| WHSV | 15.57 | 14.49 |
| CONV. WT % | 70.14 | 71.36 |
| H2 WT % | 0.12 | 0.18 |
| DRY GAS WT % | 1.77 | 2.03 |
| TOTAL C3 WT % | 5.84 | 5.99 |
| C3 = WT % | 4.26 | 4.19 |
| TOTAL C4 WT % | 10.82 | 11.14 |
| IC4 WT % | 5.58 | 6.08 |
| C4 = WT % | 3.99 | 3.69 |
| C5 + GASOL WT % | 46.26 | 46.32 |
| C5 + /CONV. | 0.66 | 0.65 |
| LCO WT % | 20.53 | 20.73 |
| GASOL + LCO WT % | 66.79 | 67.05 |
| HCO WT % | 9.33 | 7.91 |
| COKE WT % | 5.34 | 5.69 |
| REC WT % | 100.77 | 99.97 |

EXAMPLE 10

20 gm UF kaolin and 30 gm ZAA solution diluted with 300 gm distilled water (DW) were homogenized, then placed in a 500 ml sealed Teflon jar and reacted at 100° C. in an air oven for 18 hours. 100 gm DW were added to the reactant stiff gel and this was stirred for two days at 23° C. 200 gm DW, 30 gm LZY-82, 57.5 gm HS-40 and 27.4 gm UF kaolin were added to the aged PILK and blended for 15 minutes. 250 gm of this slurry was then dried in an air oven and the hard cake crushed and sieved as in Example 9. The microactivity data is shown in Table 4, obtained in the same manner as Example 9, and using the same steam deactivation procedure. This catalyst shows excellent stability and activity, with good coke, LCO and HCO selectivities,

TABLE 4

| C/O | 3.15 | 3.43 |
|---|---|---|
| WHSV | 15.23 | 14.08 |
| CONV. WT % | 67.09 | 69.00 |
| H2 WT % | 0.09 | 0.09 |
| DRY GAS WT % | 1.58 | 1.63 |
| TOTAL C3 WT % | 5.43 | 5.92 |
| C3 = WT % | 4.31 | 4.67 |
| TOTAL C4 WT % | 10.17 | 10.82 |
| IC4 WT % | 4.84 | 5.37 |
| C4 = WT % | 4.46 | 4.50 |
| C5 + GASOL WT % | 45.95 | 46.66 |
| C5 + /CONV. | 0.69 | 0.68 |
| LCO WT % | 22.38 | 21.97 |
| GASOL + LCO WT % | 68.34 | 68.63 |
| HCO WT % | 10.53 | 9.03 |
| COKE WT % | 3.86 | 3.89 |
| REC WT % | 98.55 | 97.78 |

What is claimed is:

1. A microporous pillared kandite clay composition which includes separated layers wherein the interlayer distances are substantially greater than the interlayer distances of a precursor of the same but non-separated clay and wherein the composition includes pillars derived from a solution of specific molecular or ionic cluster compounds selected from the group consisting of an inorganic oxide, sulfide, metal cluster and combinations thereof wherein said pillars separate and cross link said layers, wherein said pillars have definite chemical composition and which on calcination, permanently pillar and separate said layers.

2. The composition of claim 1 wherein the kandite clay composition comprises kaolinite.

3. The composition of claim 1 wherein the kandite clay composition comprises halloysite.

4. The composition of claim 1 wherein the kandite clay composition comprises a mineral form.

5. The composition of claim 1 wherein the kandite clay composition comprises a synthetic form.

6. The composition of claim 1 wherein the inorganic oxide is at least one selected from the oxides of elements in the 3rd, 4th, 5th, or 6th period of the Periodic Table.

7. The composition of claim 1 wherein the kandite includes micropores of diameter less than 30 Å.

8. The composition of claim 4 wherein the inorganic oxide is selected from at least one of the group consisting of oxides of elements in the III-B, IV-B, and VI-B Groups of the Periodic Table.

9. The composition of claim 4 wherein the inorganic oxides are selected from at least one of the group consisting of alumina, and silica and titania.

10. The composition of claim 4 wherein the inorganic oxide is zirconia.

11. The composition of claim 5 wherein the inorganic oxide comprises a mixture of phosphorus and molybdenum oxides.

12. The composition of claim 1 wherein a least a portion of any exchangeable cations in said composition are exchanged with cations selected from the group consisting of hydrogen, ammonium, Groups I-B to VIII-B members of the Periodic Table and mixtures thereof.

13. A process for producing pillared kandite clay compositions which includes separated layers wherein the interlayer distances are substantially greater than the interlayer distances of a precursor of the same but non-separated clay and wherein the composition includes pillars derived from molecular or ionic compounds selected from the group consisting of an inorganic oxide, sulfide, metal cluster and combinations thereof which separates said layers, comprising the steps of:
   i) intimately mixing an amount of a finely divided kandite clay precursor with a solution comprising water to produce a precursor suspension slurry;
   ii) adding an effective amount of pillaring medium to said precursor suspension and maintaining said mixture for a period of time sufficient to allow infusion of the pillaring medium into the clay precursor;
   iii) heating the kandite clay precursor containing the pillaring medium at a temperature sufficient to decompose the pillaring medium to an inorganic pillar separating layers of the precursor and therefore produce the pillared kandite clay composition.

14. The process of claim 13 in which the pillaring medium includes clusters having at least four metal cations.

15. The process of claim 13 wherein the mixture of clay precursor suspension and pillaring medium are maintained at an temperature between room temperature and about 200° C. during infusion of the pillaring medium.

16. The process of claim 13 wherein the step iii of heating the kandite clay precursor infused with the pillaring medium to decompose the pillaring medium takes place in an oxidizing atmosphere.

17. The process of claim 13 wherein the kandite slurry is first adjusted to a pH between 2 and 5 prior to contacting with the pillaring species.

18. The process of claim 13 wherein the seep iii of heating the kandite clay precursor infused with the pillaring medium to decompose the pillaring medium takes place in a reducing atmosphere.

19. The process of claim 13 wherein the step iii of heating the kandite clay precursor infused with the pillaring medium to decompose the pillaring medium takes place in a sulfiding atmosphere.

20. The process of clam 13 wherein the step iii of heating the kandite claim precursor infused with the pillaring medium to decompose the pillaring medium takes place in an inert atmosphere.

21. The process of claim 13 wherein the kandite clay precursor is selected from the group consisting of kaolinite, halloysite, nacrite and dickite.

22. The process of claim 13 wherein the pillaring medium is selected so as to produce a decomposed pillaring medium selected from the oxides of elements in the 3rd, 4th, 5th or 6th periods of the Periodic Table.

23. The process of claim 24 wherein the pillaring medium is additionally selected to produce a decomposed pillaring medium selected from the group consisting of the oxides of elements in the III-B, IV-B, V-B, and VI-B Groups of the Periodic Table.

24. The process of claim 13 wherein the pillaring medium is selected to produce a decomposed pillaring medium comprising at least one oxide selected from the group consisting of magnesia, alumina and silica.

25. The process of claim 13 wherein the pillaring medium is selected to produce a decomposed pillaring medium comprising a mixture of phosphorus and molybdenum oxides.

26. The process of claim 13 additionally comprising the steps of pretreating said kandite clay products with acidic solutions sufficient to leach octahedral or tetrahedral framework cations from the layers.

27. The process of claim 13 additionally comprising the step of adding an effective amount of an expanding non-pillaring medium to the precursor suspension prior to adding the pillaring suspension so as to expand the interlayer distance between clay layers.

28. The process of claim 26 wherein the expanding non-pillaring medium is selected from the group consisting of salt molecules and polar organic solvents.

29. The process of claim 27 wherein the expanding non-pillaring medium is a salt selected from the group consisting of potassium acetate and a mixture of $NH_4F$-DMSO.

30. The process of claim 27 wherein the expanding non-pillaring medium is selected from the group consisting of $C_1$ to $C_4$ alcohols and glycerol.

* * * * *